March 9, 1937. W. WOELFLIN 2,072,918
METHOD OF AND APPARATUS FOR INTRODUCING HIGH POTENTIALS INTO A DEHYDRATOR
Filed March 26, 1934 2 Sheets-Sheet 1
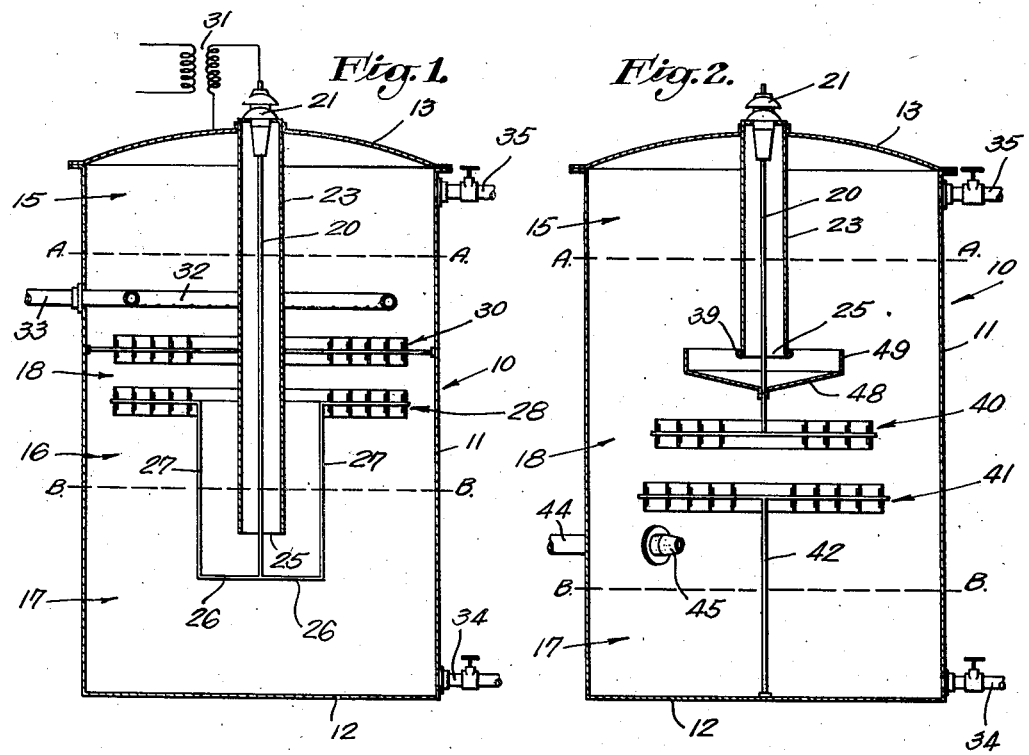
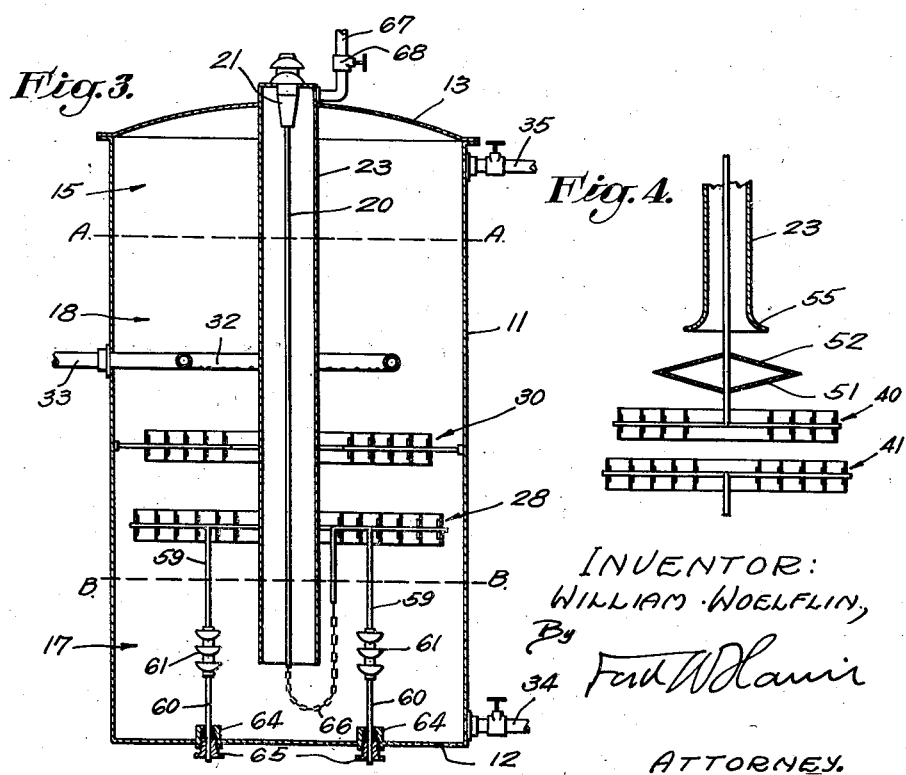
INVENTOR:
WILLIAM WOELFLIN,
By
ATTORNEY.

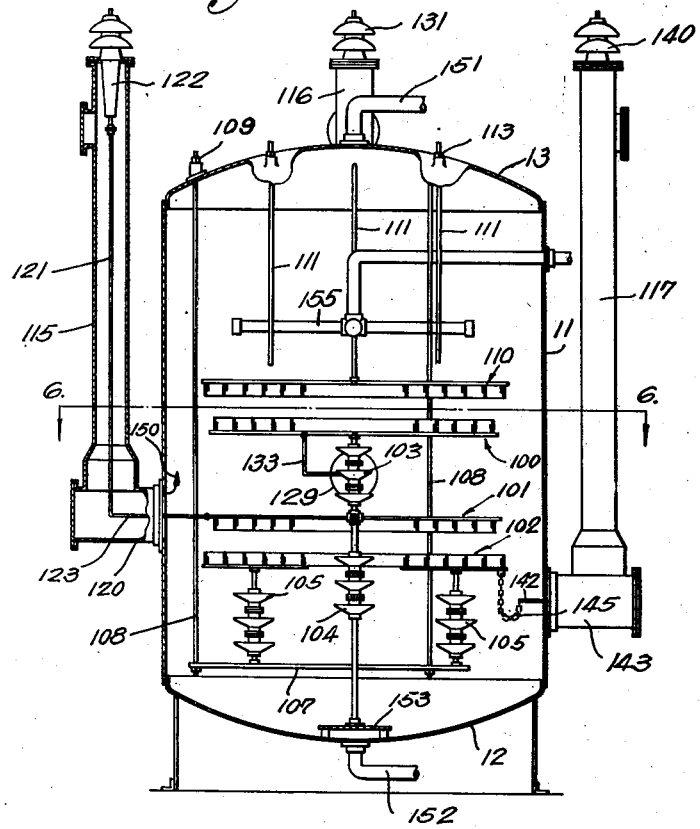
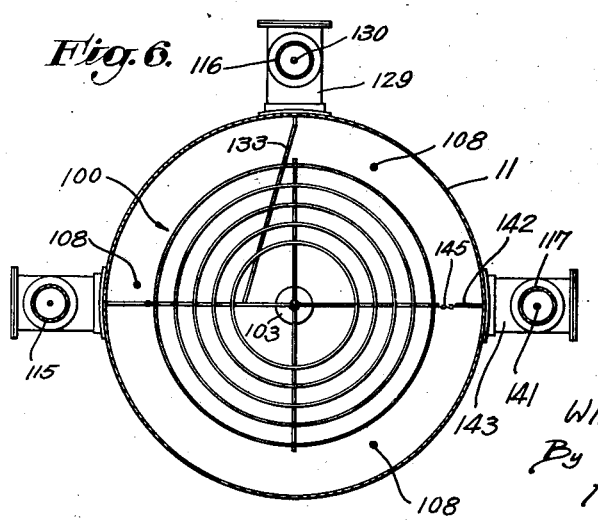

Patented Mar. 9, 1937

2,072,918

UNITED STATES PATENT OFFICE 2,072,918

METHOD OF AND APPARATUS FOR INTRODUCING HIGH POTENTIALS INTO A DEHYDRATOR

William Woelflin, Long Beach, Calif., assignor to Petroleum Rectifying Company of California, Los Angeles, Calif., a corporation of California Application March 26, 1934, Serial No. 717,396

13 Claims. (Cl. 204—24)

My invention relates to a novel method and apparatus for introducing high potentials into an electric treater. The invention is particularly applicable for use in conjunction with electric dehydrators for emulsions, particularly when these emulsions contain one phase of a material of high conductivity and another phase of a material of relatively low conductivity. It is in this capacity that the invention will be particularly illustrated and described, though it will be clear that the method and apparatus herein set forth is applicable to other treaters or systems.

When such emulsion constituents are undergoing separation in a tank, the phase-liquid of relatively high conductivity moves to one end of the tank, while the phase-liquid of relatively low conductivity moves to the other end of the tank. It is an object of the present invention to provide a method of and apparatus for introducing high potentials into such a tank through that end of the tank containing a phase-liquid of relatively high conductivity.

In the treatment of petroleum emulsions the conducting phase-liquid is usually water or water solutions, the other phase-liquid being oil of lower density than the water. Thus, the water tends to gravitate to the bottom of the tank. When treating other emulsions, however, the conducting phase-liquid may be of lower density than the other phase-liquid. Thus, in treating certain tar emulsions containing a dispersed phase of water and a continuous phase of tar, the water will collect in the upper end of the tank, while the tar will gravitate to the lower end thereof, the term water as hereinafter used including either pure or substantially pure water or the aqueous phase of a conducting nature and which may contain dissolved inorganic or organic matter or both. In this instance, if the potentials are introduced through the bottom of the tank, many difficulties are encountered with leakage around the necessary insulator means, and with certain emulsions an accumulation of sludge builds up around the insulator means, thus increasing the tendency toward electrical failure of this insulator means. Further, such a system ordinarily necessitates an increase in overall vertical dimension of the treater, for the treater tank must ordinarily be positioned a distance above the supporting surface so as to provide room for the incoming conductors. Further, replacement or inspection of the insulator means necessitates draining the entire tank, and electrical or mechanical failure of such insulator means ordinarily results in leakage into the space below the tank, this leakage being very undesirable both from the standpoint of plant cleanliness and because it constitutes a fire hazard. Thus, such a tank includes a wet zone and a relatively dry zone, and it is an object of the present invention to provide a method and apparatus for introducing potentials into the tank through the wet zone by suitably protecting the insulator means or conductor means from the material in this wet zone.

It is a further object of the present invention to provide a method and apparatus for introducing high potentials into a tar dehydrator which involves introducing these potentials through the upper end of the tank, thus eliminating the difficulties set forth above and allowing the high potential transformer or other current source to be positioned at or on the upper end of the tank so as to be in a zone away from accidental contact by operators.

It is a further object of the invention to provide in one end of a treater tank separated bodies of a conducting liquid and a dielectric fluid, and to introduce the potentials into the tank through this dielectric fluid, this dielectric fluid being either a dielectric liquid or a gas of sufficient dielectric strength.

It is a further object of the invention to protect an insulating means or a conducting means from the liquid of high conductivity by the use of a boot extending completely through this liquid of high conductivity and opening in the tank interior in a zone wherein the material is of higher dielectric strength than is the liquid of high conductivity.

It is a further object of the invention to extend this boot inward from one end of the tank to a position beyond the electrode means in the tank.

It is a further object of the invention to provide a system for introducing high potentials into a tank which requires the use of a minimum number of insulator means, it being often possible in the present invention to utilize a single insulator means which not only insulates the incoming potentials, but also supports the electrode structure, thus dispensing with other insulator means for supporting this electrode structure.

It is a further object of the invention to introduce the incoming emulsion into the space between such a boot and the tank.

A further object of the invention lies in the provision of a suitable baffle or deflector which guides from the open end of the boot any conducting material which might otherwise tend to enter therein.

Still a further object of the invention resides in continuously dehydrating the dielectric fluid through which the incoming potentials are introduced, thus maintaining the dielectric properties of this fluid.

Further objects and advantages of the present invention will be made evident hereinafter.

In the drawings I have illustrated several forms of structures involving the concepts herein set forth. Other modifications will be apparent to those skilled in the art. Thus:

Fig. 1 illustrates one form of treater particularly applicable to the dehydration of tar emulsions.

Figs. 2 and 3 illustrate alternative forms of the treaters shown in Fig. 1.

Fig. 4 illustrates a modified form of the baffle structure shown in Fig. 2.

Fig. 5 is an alternative form of treater in which the boots extend exterior of the tank.

Fig. 6 is a horizontal sectional view taken on the line 6—6 of Fig. 5.

Referring particularly to Fig. 1, I have diagrammatically illustrated a treater or dehydrator 10 including a tank 11 closed at its lower end by a lower wall 12 and at its upper end by an upper wall 13. In treating tar emulsions, or other emulsions in which the lighter phase-liquid is relatively more conducting than the heavier phase-liquid, the upper end of the tank 10 will provide a wet zone 15 above the line A—A, this zone including a body of water or other conducting phase-liquid which has moved to the upper part of the tank 10. That portion of the tank 10 below the level A—A is hereinafter referred to as a relatively dry zone and is indicated in general by the numeral 16. In practice, this relatively dry zone includes two rather distinct liquid bodies, one below the level B—B and the other between the level B—B and the level A—A. In a tar dehydrator the space below the level B—B comprises a dry zone 17 containing a body of tar. If other emulsions are being treated, the body of liquid in this dry zone may contain any liquid of lower conductivity than the liquid in the wet zone 15. If the treater is being used for dehydrating tar emulsions, the space between the levels A—A and B—B hereinafter termed an intermediate zone 18, will contain emulsion undergoing separation. Thus, in this form of treater the material in the wet zone 15 is the most conducting, while the material in the dry zone 17 is the least conducting, the material in the intermediate zone 18 being of intermediate conductivity.

In introducing the necessary potentials into such a tank, the present invention comprehends the use of a conductor means 20 associated with an insulator means 21 of any form suitable to insulate the conductor means 20 from the grounded portions of the apparatus. As shown, this conductor means extends downward through the upper wall 13 of the tank 11 and is shown as extending downward to a position below the wet zone 15 and the intermediate zone 18. The present invention involves a suitable protecting means for this conductor means 20 or for the insulator means 21 or for both, which protecting means prevents contact of the material in the wet zone 15 with the conductor means or insulating means.

Such a protecting means may be in the form of a suitable dielectric around the conductor means.

In the form shown in Fig. 1 I have illustrated a tube or boot 23 containing a dielectric medium and serving to thus protect the conductor means 20 and the insulator means 21. The insulator means 21 is shown as being in the form of an insulating bushing extending into the upper end of this boot. It will be understood, however, that the invention is not limited to the protection of an insulating bushing, but comprehends the protection of any insulator means such as a string of insulators, etc. It is preferable in this form of the invention to have the boot 23 closed at its upper end and to have this boot extend in fluid-tight relationship with the top wall 13. The body of dielectric fluid inside the boot 23 is thus separated from the material in the wet zone 15, this dielectric fluid being either a dielectric liquid or a dielectric gas. Any suitable means, not shown, may be used for introducing this body of dielectric fluid into the boot 23. The lower or innermost end of the boot 23 is indicated by the numeral 25 and opens on the liquid in the tank at a position below the wet zone 15. In the form shown in Fig. 1 the boot extends downward completely through the intermediate zone 18 and opens on the dry zone 17 containing the tar or other material of relatively poor conductivity.

The conductor means 20 extends through this open end 25 and is shown as including outward extending conductors 26 which in turn carry upward extending conductors 27 which support a live electrode 28. This live electrode is preferably positioned in the intermediate zone 18, and in the form shown in Fig. 1, is positioned above the lower open end 25 of the boot and in the annular space between this boot and the tank 11. This structure permits the entire weight of the live electrode 28 to be supported on the conductor means 20, this conductor means in turn being suspended from the insulator means 21. However, in other instances it is possible to provide an auxiliary insulating support for the live electrode utilizing the conductor means 20 only for energizing purposes.

A grounded electrode 30 is shown as being positioned above the live electrode structure in the annular space between the boot 23 and the tank 11. Such a grounded electrode structure may be supported either from the boot 23 or from the tank as shown. Any suitable forms of live and grounded electrodes may be utilized. Preferably, however, these electrodes should be of interstitial character. In the form shown each of these electrodes includes concentric metallic rings with substantially equipotential spaces therebetween, these rings being supported on a suitable framework. The most concentrated portions of the electric field established between these electrodes will thus be along the lines adjoining the adjacent edges of the annular rings incorporated in these electrodes. Any suitable supply means may be utilized for energizing the electrode 20 and thus establishing an electric field in the tank. As shown, this supply means includes a transformer 31, one high-tension terminal of which is grounded to the tank and the other high-tension terminal of which is connected to the conductor means 20.

The treater may be used either as a batch treater or can be used in performing a continuous treatment. In the latter instance, the emulsion may be introduced into the annular space between the boot 23 and the tank 11 by any suitable means such as the annular discharge pipe 32 shown, this pipe communicating with a pipe 33 carrying the incoming emulsion. In this form the emulsion is introduced in a downward direction in the intermediate zone 18. In some instances, however, it is possible to position the pipe 32 above the level A—A so that the incoming emulsion will be preliminarily washed in the wet zone 15 before dropping to the intermediate zone 18 for treatment.

The separated emulsion constituents can be withdrawn from opposite ends of the tank by conventional means such as the pipes 34 and 35 illustrated. By suitably controlling the flow through these pipes, the levels A—A and B—B can be maintained. Any suitable auxiliary means may be utilized for showing or controlling the relative positions of these levels.

It should not be understood, however, that it is always necessary to extend the boot 23 into the dry zone 17. The essential factor is that this boot extends to a point below the wet zone 15, but in some instances it may terminate in the intermediate zone 18. Such a construction is shown in Fig. 2. If desired a ring 39 may be used to distribute the electric stresses at the lower open end of this boot 23, thus eliminating intense fields which otherwise tend to form adjacent this open end of the boot. In this form of the invention the live electrode is indicated by the numeral 40 and is positioned above the grounded electrode indicated by the numeral 41, this grounded electrode being supported from the tank or on a suitable support 42 extending upward from the bottom wall 12 of the tank. The emulsion introduction means disclosed in this form of the invention includes a pipe 44 delivering emulsion to a nozzle 45 which may be directed radially or tangentially into the intermediate zone 18.

It is usually preferable with such a construction to utilize a baffle means below the lower open end 25 of the boot 23. Such a baffle means is indicated in Fig. 2 by the numeral 48 and is preferably of conical shape so as to move outward any water or conducting particles rising in the intermediate zone 18 toward the open lower end 25 of the boot 23. If desired, a vertical flange 49 may be positioned on this baffle means, it being preferable to extend this flange upward to a position slightly above the lower open end 25 of the boot 23. This is not, however, essential, and it is often possible to dispense entirely with this flange 49. So also the upper end of this flange 49 may be made to terminate below the lower open end 25 of the boot 23, especially where the heavier phase-liquid which may settle in the conical baffle 48 is of sufficient dielectric strength to properly insulate the conductor means 20 with respect to the lower open end 25 of the boot 23.

In other instances it is possible to utilize a baffle structure such as indicated in Fig. 4. This baffle structure includes a lower conical surface 51 diverging upward and an upper conical surface 52 diverging downward. The lower surface thus moves any conducting particles away from the lower open end of the boot 23, while the upper conical surface guides any of the heavier phase-liquid outward and downward through the electric field for additional treatment. This upper surface also prevents accumulation thereadjacent of any of the heavier phase-liquid. Fig. 4 shows a construction which can be used in place of the ring 39 shown in Fig. 2 to more nearly equalize the electrical stresses at the open end of the boot 23. This construction includes a flared portion 55 on the lower end of the boot.

The form of the invention shown in Fig. 3 is very similar to that shown in Fig. 1 with the exception that reliance is not placed upon the insulator means 21 and the conductor means 20 for supporting the live electrode 28. In this form the live electrode is supported on rods 59 and 60 carrying strings of insulators 61. The strings of insulators 61 are positioned below the level B—B in the zone 17 and are thus protected by the dielectric properties of the heavier phase-liquid.

It is often desirable to be able to change the vertical position of the live electrode 28 with respect to the grounded electrode 30. To accomplish this end the rods 60 may extend downward through chambers 64 in each of which is positioned a compressible packing. These packings may be compressed by glands 65, this structure thus serving the dual purpose of sealing the rods 60 with respect to the tank and permitting vertical adjustment of these rods and thus changing the vertical position of the live electrode 28. When the electrode is in the desired position, the glands are tightened to compress the packing to frictionally retain the rods 60 in their proper position. A chain 66 or other flexible conductor may be utilized for conducting the high potential currents from the conductor means 20 to the live electrode 28 without interfering with the vertical adjustment of this electrode.

The form of the invention shown in Fig. 3 also differs from that shown in Fig. 1 in that the upper end of the boot 23 communicates with a pipe 67 through which the heavier phase-liquid can be withdrawn, the pipe 34 being used only for drainage purposes or for withdrawing any sludge which may settle in the bottom of the tank 11. With this mode of operation it is necessary that the heavier phase-liquid be of sufficiently high dielectric strength to prevent excessive current flow between the conductor means 20 and the boot 23. The outflowing liquid moving upward in the boot 23 serves to wash the insulating means 21 before being withdrawn through the pipe 67. If desired, a suitable vacuum may be provided on this pipe 67 to draw the heavier phase-liquid from the tank. This is usually unnecessary, however, in view of the fact that the incoming emulsion moving through the pipe 33 is introduced at such pressure as to maintain the pressure inside the tank 11 above atmospheric pressure. It is thus only necessary to provide a valve 68 in the pipe 67 for controlling the flow of the heavier phase-liquid.

In the form of the invention shown in Fig. 3, the heavier phase-liquid rising inside the boot is subjected to dehydrating action due to the electric field around the conductor means 20, the outer portion of this field being bounded by the boot 23 if this boot is formed of metal material and is grounded, or by the conducting liquid in the wet zone 15 if this boot is made of non-conducting material or is otherwise insulated from the grounded tank. If the outflowing liquid is moved into an auxiliary settling tank, any water coalesced in this field will gravitate from the remainder of the heavier phase-liquid.

So also, in the forms of the invention shown in Figs. 1 and 2, the dielectric fluid in the boot 23 will be continuously subjected to a dehydrating action during the time that the treater is in operation. As this dielectric fluid is usually of lower density than either of the emulsion constituents, it will be clear that any water particles which might enter the boot 23 will be coalesced by the field around the conductor means 20 and will drop downward in this boot to the open lower end thereof and will then rise in the liquid in the zones 17 and 18 to the wet zone 15. Due to this auxiliary dehydrating action of the dielectric fluid in the boot 23 there will be no danger of contamination thereof.

A modified form of the invention is shown in Fig. 5. Here a plurality of live electrodes is employed, these electrodes being indicated respectively by the numerals 100, 101, and 102. A string of insulators 103 may be utilized for insulating the electrodes 100 and 101 from each other and for supporting the electrode 100. Similarly, a string of insulators 104 may be utilized for insulating the electrode 101 from the tank and for supporting the electrodes 100 and 101. Strings of insulators 105 are shown as supporting the live electrode 102. It is often desirable to be able to adjust the vertical position of this live electrode 102. This may be accomplished by mounting the strings of insulators 105 on a frame 107 carried by rods 108 extending upward through the upper wall 13 of the tank and carrying nuts 109 threaded thereto so that by rotating these nuts the vertical position of the electrode 102 may be changed. A grounded electrode 110 is illustrated above the electrode 100 and is vertically adjustable, being suspended from rods 111 which extend through the top wall 13 of the tank and threadedly receive nuts 113, thus permitting vertical adjustment.

To supply high potentials to these electrodes, several of the boots 23 may be utilized, these boots extending downward between the periphery of these live electrodes and the tank 11 or extending exterior of the tank as illustrated in Fig. 5. As shown, three of these boots may be utilized, indicated respectively by the numerals 115, 116, and 117, the upper ends of these boots being positioned adjacent or above the upper wall 13. The lower end of the boot 115 carries an inward extending pipe 120 opening on the interior of the tank at a section opposite the electrode 101. A conductor means 121 is associated with an insulator means 122 extending downward in the boot 115, this conductor means having an inward extending portion 123 electrically connected to the live electrode 101. Similarly, the lower end of the boot 116 carries an inward extending pipe 129 opening on the interior of the tank at a position between the electrodes 100 and 101. A conductor means 130 is disposed in this boot and is associated with the insulating means 131, this conductor providing an inward extending portion 133 which is bent upward so as to be electrically connected with the electrode 100.

In the same manner the boot 117 is provided with an insulating means 140 and a conducting means 141, this conducting means providing an inward extending portion 142 extending through an inward directed pipe 143 at a level which is preferably below the electrode 102. A chain or other flexible conductor 145 electrically connects the portion 142 of the conductor means and the electrode 102, this chain permitting vertical adjustment of this electrode.

The electrode structure shown in Fig. 5 permits the establishment of several independent or interrelated electric fields in the tank 11. Thus, one high potential source may be connected through ground to the grounded electrode 110, and connected to the live electrode 100 through the conductor means 130. Another high potential source may be connected between the electrodes 101 and 102 by connecting this source across the conductor means 121 and 141. Various other electrical connections may be utilized. Thus, electric fields can be established between the electrodes 110 and 100, between the electrodes 100 and 101, between the electrodes 101 and 102, and between the electrode 102 and the bottom of the tank, as well as fields between each of these live electrodes and the tank.

In this form of the invention the interior of each of the boots 115, 116, and 117 is preferably filled with a dielectric fluid, either a liquid or a gas being supplied thereto by any suitable means, not shown. Any of the emulsion to be treated entering the inward extending pipes 120, 129, or 143 will be dehydrated due to the fields established in these pipes. Water particles or other conducting particles thus separated in these pipes will move upward inside the tank from the upper portions of these pipes as indicated by the arrow 150. Such coalesced conducting particles will not move upward inside the boots due to the fact that the dielectric fluid in these boots is of lower density than the liquid forming the conducting particles.

In this form of the invention the lighter phase liquid is withdrawn through a pipe 151, while the heavier phase is withdrawn through a pipe 152 which intakes below a plate 153 spaced a small distance above the bottom wall 12 of the tank. A cross-shaped pipe 155 may be used for discharging the incoming emulsion into the treater, this pipe carrying perforations preferably positioned in the lowermost portions thereof so that the incoming emulsion is directed downward into the fields. Any suitable type of interstitial electrodes may be utilized, the preferred embodiment including electrodes including a frame-work on which concentric rings are disposed as illustrated.

One advantage of positioning the boots outside the tank 11, rather than between this tank and the peripheries of the electrodes therein, is that the tank 11 can be made smaller in diameter than would otherwise be the case, assuming a given size of electrode. By enlarging the tank, however, it is entirely possible to extend these boots downward inside the tank 11, using the principles illustrated in Figs. 1 to 3 inclusive.

Various other modifications may be made in the forms of the invention herein disclosed without departing from the spirit of the invention, such modifications falling within the scope of the appended claims.

I claim as my invention:

1. In combination in an electric dehydrator for emulsions containing a phase of material of high conductivity and a phase of material of low conductivity: a tank containing a body of said material of high conductivity in an upper portion thereof and a body of said material of low conductivity therebelow; a boot providing a lower end opening sidewise on the interior of said tank at a section below said body of material of high conductivity; an insulator means in said boot; conductor means associated with said insulator means and extending sidewise from said boot at said section; and electrode means in said tank and electrically connected to said conductor means.

2. In combination in an electric treater: a tank providing a wet zone and a relatively dry zone; a boot extending in said tank from the end adjacent said wet zone and completely through said wet zone and providing an open end opening on said relatively dry zone; insulating means in said boot and protected thereby from said wet zone, said boot containing a material having a dielectric strength sufficient to prevent electric failure of said insulating means; conductor means associated with said insulating means and extending from said open end of said boot into said relatively dry zone; means in said tank and energized through said conductor means; and means supplying current to said conductor means.

3. In combination in an electric dehydrator for emulsions containing a phase of material of high conductivity and a phase of material of low conductivity: a tank containing in an upper wet zone thereof a body of said material of high conductivity and containing in a lower relatively dry zone thereof a body of said material of low conductivity; a boot extending downward inside said tank completely through said wet zone and thus through said material of high conductivity and providing a lower open end opening on the interior of said tank in said relatively dry zone at a level below said body of material of high conductivity; insulator means in said boot and protected thereby from said material of high conductivity; conductor means associated with said insulator means and extending from said lower open end of said boot; an electrode means in said tank below said wet zone and electrically connected to said conductor means; and means for changing the vertical position of said electrode means, said conductor means including a flexible section extending from said lower end of said boot and into said relatively dry zone to permit such change in vertical position of said electrode means.

4. In combination in an electric dehydrator for emulsions containing a phase of material of high conductivity and a phase of material of low conductivity: a tank containing in an upper wet zone thereof a body of said material of high conductivity and containing in a lower dry zone thereof a body of said material of low conductivity and containing in an intermediate zone between said wet zone and said dry zone a body of emulsion; a boot extending downward inside said tank completely through said wet zone and said intermediate zone and providing a lower open end opening on said body of liquid of low conductivity in said dry zone; insulator means in said boot and protected thereby from said material of high conductivity; conductor means associated with said insulator means and extending from said lower open end of said boot; and an electrode means in said tank below said wet zone and electrically connected to said conductor means.

5. A combination as defined in claim 4 in which said electrode means is positioned above said open end of said boot and in said intermediate zone and in which said conductor means extends downward from said open lower end of said boot and upward outside said boot to said electrode means.

6. In combination in an electric dehydrator for emulsions containing a phase of material of high conductivity and a phase of material of low conductivity; a tank containing in an upper wet zone thereof a body of said material of high conductivity and containing in a lower dry zone thereof a body of said material of low conductivity and containing in an intermediate zone between said wet zone and said dry zone a body of emulsion; a boot extending downward inside said tank completely through said wet zone and thus through said body of material of high conductivity and providing a lower open end opening on said body of emulsion in said intermediate zone; insulator means in said boot and protected thereby from said material of high conductivity; conductor means associated with said insulator means and extending from said lower open end of said boot; an electrode means in said tank below said wet zone and electrically connected to said conductor means; and a baffle means below said open lower end of said boot and guiding any of said material of high conductivity rising in said tank from the vicinity of said lower open end of said boot and into the space around said boot.

7. A method of treating an emulsion comprised of a phase of conducting liquid and a phase of liquid of poor conductivity by the use of a tank, which method includes the steps of: maintaining in an upper portion of said tank separated bodies of said conducting liquid and a dielectric liquid; introducing a high-potential current into said tank through said body of dielectric liquid; continuously dehydrating said dielectric liquid to remove therefrom any particles of said conducting liquid which may become associated therewith; maintaining a body of emulsion below said body of conducting liquid; and establishing an electric field in said body of emulsion to coalesce said conducting phase thereof into masses of sufficient size to rise into said body of conducting liquid in said upper portion of said tank.

8. A method as defined in claim 7 in which said dielectric liquid is of lower density than said conducting liquid and communicates with said body of emulsion whereby particles of said conducting liquid coalesced in said dielectric liquid fall therein but rise in said emulsion to said body of conducting liquid in the upper portion of said tank.

9. A method of treating an emulsion composed of a phase of conducting liquid and a phase of liquid of poor conductivity, which method includes the steps of: maintaining in one end of a chamber separated bodies of said conducting liquid and said liquid of poor conductivity, said body of liquid of poor conductivity being in a protecting zone; maintaining in the other end of said chamber a body of said liquid of poor conductivity in communication with said protecting zone; continuously introducing said emulsion into said chamber; introducing a high potential into said chamber through said protecting zone; establishing in said chamber an electric field by use of said high potential, said electric field being of sufficient intensity to coalesce the dispersed phase of said emulsion so that gravitational separation of said phase of conducting liquid and said phase of poor conductivity takes place in said chamber; and continuously moving a stream of said liquid of poor conductivity from said other end of said chamber through said protecting zone and thence to a position exterior of said chamber.

10. In combination in an electric treater for an emulsion containing a phase of liquid of high conductivity and a phase of liquid of low conductivity: a tank containing in one end thereof a body of said liquid of low conductivity; a boot providing an open end extending into said body of liquid of low conductivity and extending vertically inside said tank to the other end thereof and containing a column of said liquid of low conductivity in communication with said body of liquid of low conductivity in said tank, said other end of said tank containing a body of said conducting liquid around said boot; insulator means in said boot; conductor means associated with said insulator means and extending therein from said open end of said boot; and means for establishing an electric field in said tank, said means including electrode means electrically connected to said conductor means.

11. In combination in an electric treater for an emulsion containing a phase of liquid of high conductivity and a phase of liquid of low conductivity: a tank containing in one end thereof a body of said liquid of low conductivity; a boot providing an open end extending into said body of liquid of low conductivity and extending vertically inside said tank to the other end thereof and containing a column of said liquid of low conductivity in communication with said body of liquid of low conductivity in said tank, said other end of said tank containing a body of said conducting liquid around said boot; insulator means in said boot; conductor means associated with said insulator means and extending therein from said open end of said boot; means for establishing an electric field in said tank, said means including electrode means electrically connected to said conductor means; and draw-off means communicating with the interior of said boot whereby said liquid of low conductivity is withdrawn from said one end of said tank and moves as a stream through said boot and thence through said draw-off means.

12. A combination as defined in claim 11 in which said draw-off means communicates with the interior of said boot at a section beyond the innermost portion of said insulator means whereby the stream of said liquid of low conductivity moving through said boot washes said insulator means before being withdrawn through said draw-off means.

13. In combination in an electric dehydrator for emulsions: a tank; a tube filled with an insulating medium and extending vertically in said tank to form an annular zone between said tank and the periphery of said tube, one end of said tube being open to communicate with the interior of said tank; electrode means in said annular zone; conductor means extending in said insulating medium in said tube and from said open end and electrically connected to said electrode means to energize same and establish an electric field in said annular zone; introduction means in said annular zone for supplying emulsion thereto and to said electric field; and withdrawal means communicating with said annular zone at a level different from the level of the section at which said introduction means introduces said emulsion into said annular zone to withdraw treated material from said annular zone.

WILLIAM WOELFLIN.